United States Patent [19]
Bauer

[11] 3,728,725
[45] Apr. 17, 1973

[54] TARGET DISPLAY FOR PULSE-ECHO RETURN SYSTEM

[75] Inventor: Lowell W. Bauer, Liverpool, N.Y.
[73] Assignee: General Electric Company, Syracuse, N.Y.
[22] Filed: Apr. 23, 1971
[21] Appl. No.: 136,897

[52] U.S. Cl. .................................. 343/9, 343/5 EM
[51] Int. Cl. .................................................. G01s 9/44
[58] Field of Search ............................. 343/9, 5 EM

[56] References Cited

UNITED STATES PATENTS

| | | | |
|---|---|---|---|
| 3,188,631 | 6/1965 | Birtley | 343/9 |
| 2,979,715 | 4/1961 | Hammond, Jr. | 343/12 R |
| 3,123,824 | 3/1964 | Sherertz | 343/5 EM |
| 3,422,396 | 1/1969 | Keller | 343/9 |
| 2,743,438 | 4/1956 | Page | 343/9 |
| 3,149,326 | 9/1964 | Naidich | 343/9 |

Primary Examiner—Benjamin A. Borchelt
Assistant Examiner—G. E. Montone
Attorney—Carl W. Baker, Richard V. Lang, Frank L. Neuhauser, Oscar B. Waddell and Joseph B. Forman

[57] ABSTRACT

This invention relates to target displays for use in pulse-echo return systems such as radar and sonar systems. In this display a plurality of echo return or target signals are simultaneously displayed with each signal represented as a short straight directed line segment, the center or one end point of such line segment being positioned on the display screen with one coordinate determined by target range (pulse transit time) and the other coordinate determined in accordance with total elapsed time since transmission of the pulse resulting in that particular target return signal. The slope of each directed line segment is made proportional to target radial velocity (range rate) as determined by doppler shift of the return signal, and the intensity of display of the line segment is made proportional to the return signal amplitude. Return signals which correlate in range, in range rate and in signal amplitude then appear as a series of directed line segments connecting or very nearly connecting with each other to form a substantially continuous and readily identifiable target track while noise signals appear as unconnected lines of random orientation.

7 Claims, 4 Drawing Figures

INVENTOR:
LOWELL W. BAUER,

BY C.W. Baker
HIS ATTORNEY.

TARGET DISPLAY FOR PULSE-ECHO RETURN SYSTEM

BACKGROUND OF THE INVENTION

The invention is directed to a system for displaying detected object information received from a pulse-echo return (radar or sonar) system.

In conventional pulse-echo object detection systems a pulse of energy, generally consisting of a number of cycles of a sine wave carrier frequency, is radiated into a medium from a source. If there is a target object in the path of the pulse it will cause some of the pulse energy to be reflected back toward the source, and the distance from the source to the target, i.e. target range, can be determined by measuring the pulse transit time to the target and return. If the target is moving, any radial component of its velocity will cause a doppler shift in frequency of the reflected pulse, and the magnitude of this doppler shift provides a measure of target radial velocity or range rate.

A number of factors including the terrain about the energy source and target object, the propagation characteristics of the medium, additional reflections from other objects, and spurious signals generated within or coupled into the pulse-echo return system, all may introduce extraneous signals or noise into the receiver output. In many pulse-echo return systems much if not all such noise content in the receiver output is displayed together with its true return signal content on a cathode ray tube (CRT) display and the operator is relied upon to visually distinguish target returns from noise, using as a primary discriminant the presence or absence or correlation between signals displayed during successive pulse intervals. Such discrimination is possible because noise signals are by nature random in character, i.e., successive signals tend to be of random distribution in time, frequency and amplitude, whereas successive target echo returns will correlate in some or all these signal parameters because the target characteristics by which they are determined remain unchanged from pulse to pulse or change in more constrained and consistent manner.

Visual correlation of successive echo returns requires a memory capability in order to enable retention and recall of earlier returns for purposes of their comparison against later returns, and commonly such capability is afforded in part by the persistence of the CRT screen phosphors but it depends in necessary part also on the memory and persistence of vision of the operator himself. This operator dependence may be reduced to some extent by superimposing successive sweep traces one upon another on the CRT screen, thus effectively integrating the superimposed traces to provide a form of pulse-to-pulse correlation. It also is possible to display successive traces in parallel side-by-side relation to facilitate operator comparison or correlation of each trace with those just preceding and just following it; commonly this is done using either a CRT with long-persistence screen, a CRT with screen periodically refreshed from an external storage device, or a chemical recorder on which the traces are permanently recorded side-by-side.

In most present day display systems, including the side-by-side displays just described, whatever facility for pulse-to-pulse correlation may be provided is limited to correlation in range and bearing and does not also include correlation in range rate. For example, the widely used plan position indicator (PPI) and B-scope display show only range and bearing, in polar and X-Y coordinates respectively. Although range rate or target velocity can be observed once the target has been identified on a PPI indicator or B-scope display as well as on side-by-side displays, velocity information is not displayed for each signal echo return and accordingly is not available to assist the operator in his initial determination whether a newly displayed blip represents a target or noise.

Thus discrimination between noise and true target signals using these and other conventional display techniques necessarily depends heavily upon the training, abilities and attentiveness of the individual operator. Particularly in the presence of high noise levels or other situations in which the number of spurious signals is large, the task of target detection with such displays may become an exceedingly difficult and fatiguing one for the operator.

SUMMARY OF THE INVENTION

The present invention has a primary objective the provision of target displays which more quickly and positively reveal to the operator the probable presence of a target, and which enable more reliable discrimination between targets and noise signals also appearing on the display. More specifically, in the display system of this invention some selected number of echo return signals, say from 10 to 50 such signals, are simultaneously displayed on a two-coordinate viewing screen with each signal being represented as a short straight line hereinafter termed a directed line segment. The center or other common reference point on each directed line segment is positioned along one coordinate in accordance with target range as measured by the transit time of the pulse thus represented. The other coordinate is determined by the total time elapsed since transmission of that particular pulse, which places the directed line segment representing the most recently received pulse at one edge of the display, that representing the oldest at the opposite edge, and the others positioned in between in accordance with their respective transmission times which for convenience may be measured in units of Pulse Repetition Periods (PRP's) since transmission. The slope of each directed line segment is made proportional to target radial velocity or range rate as measured by the doppler frequency shift of the return signal represented by that line segment, and its intensity is made proportional to the amplitude of the return signal.

Since the position of each directed line segment shifts with time along one coordinate axis, which preferably is the horizontal axis, the display provides a moving window format in which the most recently received pulse representation first appears at one edge of the window and then advances one step across the window upon each successive pulse interval. That is, each directed line segment is bodily shifted by its own width once each pulse repetition period, or other pulse interval, until it completes its traverse across the window and disappears off the window far edge.

The directed line segments constituting these pulse representations preferably are all of the same width just equal to the width of the viewing screen divided by the number of pulse representations to be displayed, which as previously noted may be of the order of 10 to 50 so that the length of each directed line segment as projected onto the time axis would be approximately one-tenth to one-fiftieth of the viewing screen width along that axis. Directed line segments which are in alignment with each other along the range axis, thus indicating pulse-to-pulse correlation in range, then will have connecting or nearly connecting ends and form a substantially continuous target trace, provided the line segments also are properly oriented as to slope thus indicating pulse-to-pulse correlation in range rate.

In this way target return signals, which normally do correlate in range and range rate, will appear on the display as a series of connected or nearly connected line segments forming a continuous and readily visible target track line, whereas noise signals generally will have random distribution in time, frequency and amplitude, so the directed line segments generated by such signals will appear as random unconnected lines not forming a continuous track and thus easily distinguishable from target tracks. Echo return signal amplitude as indicated by line segment brightness along the target trace further enchances the visibility of target information provided.

It is accordingly an object of this invention to display return signals generated by a pulse-echo return system in such a manner as to assist the operator in distinguishing target returns from extraneous signals and noise, and to provide a readily visible target trace from echo return signals reflected from a target.

Another object of this invention is to provide a target display system for visual correlation in both range and radial velocity of the return signals of a pulse-echo return system.

And yet another object of this invention is to provide a time history display of return signals from a pulse-echo return system, in which target range, radial velocity and signal strength information are simultaneously visually presented for operator analysis.

A more complete understanding of this invention can be had from a reading of the following detailed description in conjunction with the accompanying drawings.

DESCRIPTION OF THE PREFERRED EMBODIMENTS

Figure 1:
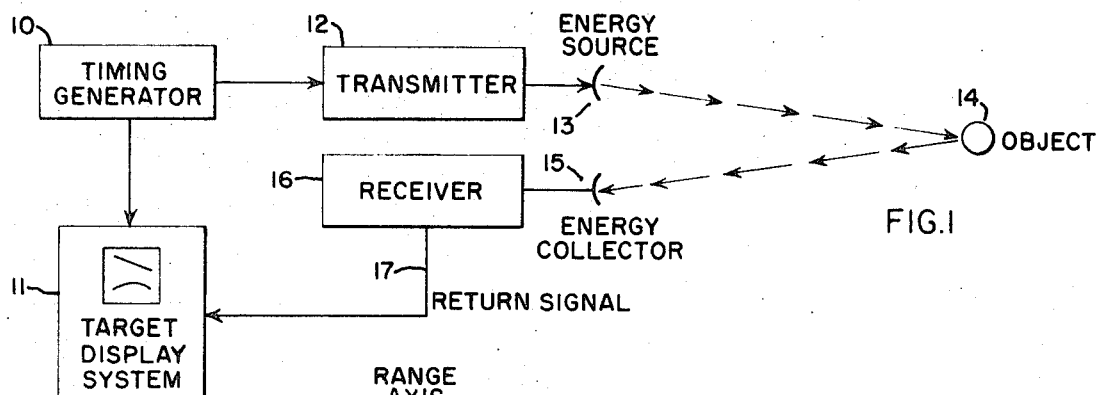
FIG. 1 is a simplified block diagram of a pulse-echo return system utilizing a display system as described herein.

FIG. 1 is a simplified block diagram of a pulse-echo return system showing the use of the target display system of this invention. The timing generator 10 synchronizes the display system 11 with the transmitter 12. The transmitter 12 in response to a timing signal from the timing generator 10 generates a pulse of energy, consisting of a number of cycles of a sine wave carrier frequency, which energy is radiated from energy source 13 into the propagation medium. Upon striking a target such as object 14, part of the energy is reflected back toward the source and into energy collector 15. The radial velocity of the target 14 causes the carrier frequency of the collected energy to be shifted by an amount proportional to target range rate. The return signal 17 from receiver 16 goes into the display system 11, which extracts the radial velocity and signal amplitude information from the return, obtains transmission time information as a timing signal from the timing generator 10 and measures target range by measurement of pulse transit time, i.e., the elapsed time for travel of the pulse from the energy source 13 to the target and back to the receiver. This information is stored and further processed in order to present the visual display herein described.

Figure 2:
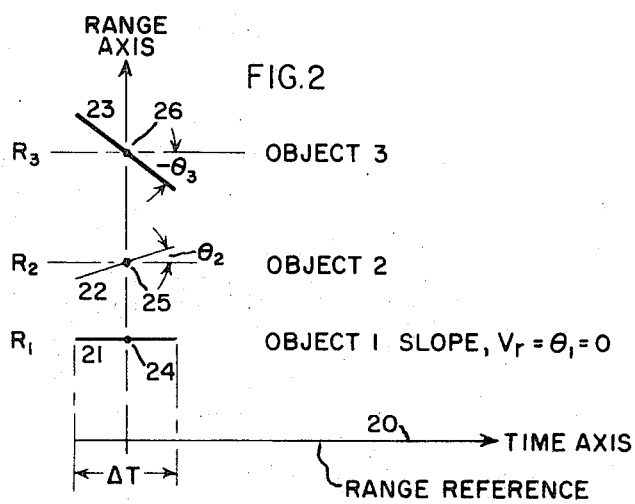
FIG. 2 shows the display format of this invention for a single pulse-echo return.

FIG. 2 shows how return signals are displayed for a single transmission. Range is displayed along the vertical axis while time is displayed along the horizontal, with the display for each echo-return having a width on the display equal to $\Delta I$ , which in this example is the pulse repetition period (PRP) or time between successive pulse transmissions. EAch return signal is displayed as a directed line segment as illustrated by lines 21, 22, and 23, representing returns from three targets each at different range from the others. The height of each directed line segment above the range reference line 20 indicates the range of the object causing the return signal. The range reference 20 can represent the source, or zero range, or alternatively may represent any other convenient reference range. The slope of each line segment is proportional to the radial velocity or range rate of the object causing the return signal, and the intensity of the line segment is proportional to the strength of the received signal.

In FIG. 2, line segment 21 indicates the presence of reflecting object 1 at a range $R_1$ as represented by the perpendicular distance from the range reference 20 to the midpoint 24 of this line segment. The line slope $\theta_1$ is equal to zero which indicates that object 1 has a relative radial velocity of zero. Line segment 22 indicates the presence of reflecting object 2 at range $R_2$ and moving away, as shown by the positive slope $+\theta_2$; line segment 23 similarly indicates a reflecting object 3 at a range $R_3$ but moving nearer as shown by the negative slope $-\theta_3$ of the line.

The slopes of plotted lines can be related to system parameters as follows. Let PRP be the time period between successive transmissions (sweeps) and $f_0$ be the center frequency of transmitted signals. If $f_d$ is the measured doppler frequency shift of signals reflected from a target moving at constant velocity, then $T_c$, the change in the time of reception of signals received in two successive repetition periods, is given by $$T_c = \text{PRP} \cdot (f_0 / f_d)$$

The angle $\theta$ of the vector plotted on the display can now be found in terms of $T_c$ and the display scaling parameters. Let $1_x$ be the distance on the display face between the centerlines of plots of successive sweeps ($\Delta T$ in FIG. 2) and let $1_y$ be the (vertical) distance on the display face that represents a unit of range time. Then $$\tan \theta = T_c (1_y / 1_x)$$

or $$\theta = \arctan [T_c(1_y/1_x)]$$

FIG. 2 also illustrates the manner in which intensity of the directed line segments provides an indication of the amplitudes of the received return signals represented thereby. Line segment 23 is the most intense indicating a very strong return signal, line segments 21 and 22 are progressively less intense indicating relatively weaker signal returns from objects at progressively greater distances or presenting smaller effective reflecting areas. It will be noted that the length of the directed line segments as projected onto the time axis is uniform, being in each case equal to ΔT.

Figure 3:
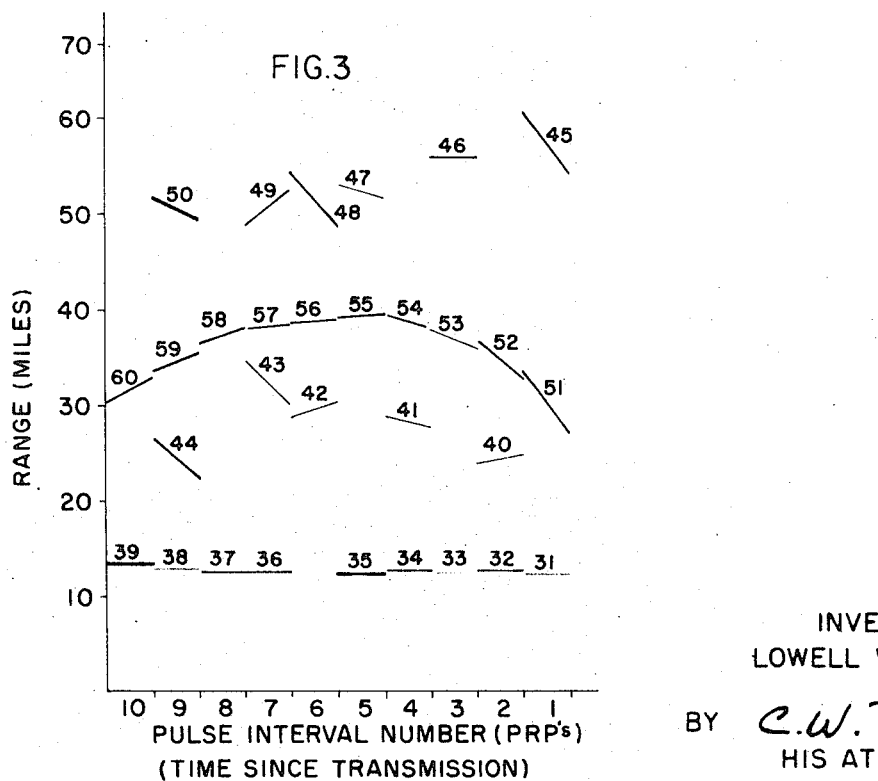
FIG. 3 shows the display format of this invention for a plurality of pulse-echo returns.

FIG. 3 illustrates the display format used in this invention in order to provide a display history for the operator. Range is indicated along the vertical axis and can be calibrated in any convenient unit of range, as for example in miles as indicated. Return signals from a successive series of pulse transmissions are displayed as directed line segments arranged along the horizontal axis each in accordance with total elapsed time since transmission of the pulse of which it represents the echo, time being indicated in any convenient units such as pulse repetition period (PRP's). The slope of each directed line segment is proportioned to target radial velocity, and more specifically is the angle whose tangent is the quotient of a change in target range divided by the time duration of the interval over which the change occurred, scaled to the display dimensions as explained above. Since in FIG. 2 the pulse intervals are themselves unit time periods, the line segment slopes are such that the projected length of each line segment onto the vertical or range axis is directly equal to the change in range for the pulse interval in which that line segment appears, so whenever there exists correlation in range and range rate between two successive echo returns the line segments representing them will have substantially coincident ends and form a substantially continuous line.

In the example of FIG. 3 the return signals from the ten most recent pulse transmissions are displayed in their order of occurrence, with the echo return information from the most recently transmitted pulse appearing above the designation Pulse Interval Number 1 and positioned at the extreme right of the display. The return information from the oldest transmitted pulse still visible on the display appears above the designation Pulse Interval Number 10 and is positioned at the extreme left of the display. Thus the directed line segment representing each echo return is displayed repeatedly, ten times in this example, each time at a location which shifts along the time axis in steps of width equal to the line length as projected onto the time axis and which corresponds to the number of PRP's elapsed since transmission of the pulse represented.

In FIG. 3 the directed line segments 31, 32, 33, 34, 35, 36, 37, 38 and 39 represent return signals from an object having a low radial component of velocity. Due to the correlation of both range and radial velocity from pulse to pulse the ends of adjacent line segments representing this low radial velocity object are touching or nearly touching thus creating a substantially continuous line readily identifiable as a target track.

Directed line segments 40, 41, 42, 43, 44, 45, 46, 47, 48, 49 and 50 represent signals caused by noise. Generally, noise signals occur randomly and while they may sometimes correlate in one or the other of range (time) and radial velocity (frequency), they are not likely to correlate in both. Thus, line segments, 45, 46, 47, 48, 49 and 50 which do happen to correlate in range still do not form a target track due to the absence of correlation in radial velocity.

Directed line segments 51, 52, 53, 54, 55, 56, 57, 58 and 59 represent echo return signals from a maneuvering object. Again, due to the correlation in both range and radial velocity the ends of the line segments representing successively transmitted pulses are touching or nearly touching creating a readily recognizable target track. The height of the track above the reference line indicates target range, and the direction and angle of track slope indicate the target range rate and whether it is approaching or departing.

FIG. 3 also illustrates how variation of the intensity of the display line segments indicates the strength of the return signal. For the low velocity target track the intensity varies from very strong for line segment 35, representing the echo return appearing at Pulse Interval Number 5, to very weak for the line segment 33 at Pulse Interval Number 3. No return signal was detected from the low velocity target at Pulse Interval Number 6 as indicated by the absence of a line segment showing for this time interval.

This variation of intensity of the display line segments with echo return signal amplitude is very helpful to target identification, providing benefits in the case of both fluctuating and non-fluctuating targets. With a non-fluctuating target the line segments will be substantially the same in intensity and so will display the target as a readily visible solid line of uniform brightness. With a fluctuating target the line segments will not be of uniform brightness, but line segments representing the stronger fluctuations will be relatively quite bright and these will alert the operator to look for additional, weaker returns along the same track.

Figure 4:
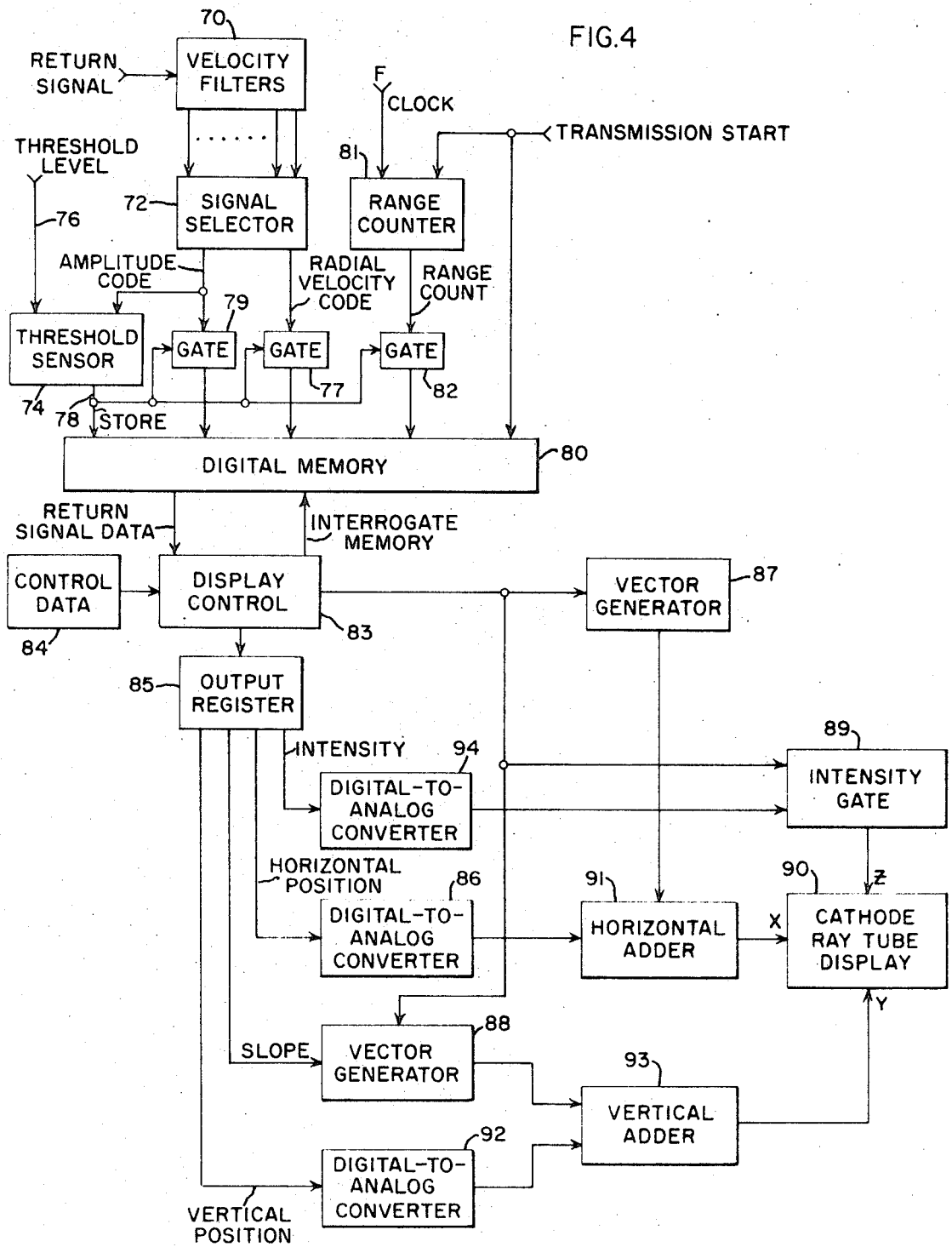
FIG. 4 is a block diagram of a preferred embodiment of this invention.

FIG. 4 is a block diagram of a system for generating a display as just described. In FIG. 4 the return signals are analyzed by a set of velocity filters 70, consisting of a plurality of filter circuits each having a narrow frequency bandwidth and having its center frequency staggered with respect to the others so that together the filter passbands span the desired range of doppler frequencies. The velocity filters 70, in effect, break the return signal into a plurality of narrowband signals which are then processed by a signal selector 72. The output signals of the velocity filters 70 may have the form of analog voltages as would be provided by a conventional doppler filter bank (see Skolnik, Introduction to Radar Systems, pages 72 – 86, 1962 edition) or digital numbers as may be provided by equivalent digital filtering techniques.

Due to such factors as noise, the presence of multiple reflecting objects and the overlap of frequency bandwidth of the velocity filters 70, more than one filter can have a signal output at any moment in time. The signal selector 72 selects the number of filter signals that are to be stored during any one range interval. The usual practice is to select the filter signal with the largest amplitude. However, the display system herein described is not limited to the selection of only the largest filter signal. Signal selector 72 consists of comparison circuits and control logic programmed to identify one or more of the filter signals with largest amplitudes. If the filter signals are analog voltages the signal selector 72 will provide the necessary analog voltage-to-digital conversion to provide a digital code representing the amplitude of the selected filter signal. The radial velocity code output of signal selector 72 is digital code identifying the selected filter.

A threshold sensor 74 acts to limit the amount of data that will be processed for display. The threshold sensor is a comparison circuit whose output 78 will cause display information to be stored only if the amplitude code of the selected filter exceeds a threshold level 76. Raising the threshold level 76 will tend to decrease the number of selected filter signals stored in the digital memory 80 while lowering the threshold level will tend to increase the number, thus controlling the amount of data to be stored in the memory. It is clear that although the threshold sensor 74 has been described in terms of a digital comparison, it can alternatively be implemented by analog comparison circuitry. Also, the threshold level 76 input to the threshold sensor 74 can be manually adjusted by a display operator or can be automatically controlled.

Range counter 81 provides a continuing count of the range time elapsed since the last pulse transmission, i.e., of pulse transit time to the target and back. A signal representing the start of transmission resets the counter to zero. The range counter 81 then counts clock pulses, F, thus maintaining a count which is proportional to the transit time of the return signal and provides a measure of target range. Read-out of the range count into digital memory is controlled by a gate 82 which is triggered by the STORE signal from threshold sensor 74, which also triggers gates 77 and 79 to synchronize read-out of the radial velocity and amplitude codes from signal selector 72 corresponding to that range count or range cell.

Thus whenever one of the filter output signal amplitudes exceeds the threshold level 76 to STORE signal output 78 of the threshold sensor 74 causes the amplitude code, radial velocity code and range count to be stored in the digital memory 80.

The display control 83 consists of logic circuitry which causes the return signal data to be read out of the digital memory 80 and, based on control data 84, modifies the return signal data and stores the modified data in the output register 85. The control data 84 includes such information as the range to be displayed, the band of radial velocities to be displayed, and the signal amplitudes to be displayed. Although the control data 84 is generally entered by a display operator from a control panel the control data 84 can also be automatically determined. The display control 83 relates the control data 84 to the return signal data from the digital memory 80 to determine whether it will be displayed. If the information is to be displayed the display control 83 provides the necessary translation of range count into vertical display position, of time elapsed since transmission into horizontal display position, of radial velocity into line slope, and of signal amplitude into line intensity. This modified information is stored in output register 85.

The horizontal position information in the output register 85 is converted into an analog voltage by digital-to-analog converter 86. The display control 83 provides a timing pulse to vector generators 87 and 88 and to intensity gate 89. The duration of this pulse is the time required to trace the directed line segment representing each return signal on the cathode ray tube display 90. Vector generator 87 responds to the timing pulse generated by the display control 83 so as to provide a voltage signal that changes linearly for the duration of the timing pulse. The output of digital-to-analog converter 86 and vector generator 87 are combined in horizontal adder 91 to provide a horizontal deflection signal to the cathode ray tube display 90.

The vertical position information in the output register 85 is converted into an analog voltage by digital-to-analog converter 92. Vector generator 88 responds to the timing pulse generated by the display control 83 so as to provide a voltage signal that is linear for the duration of the timing pulse and whose slope is proportional to the slope information in the output register 85. The output of digital-to-analog converter 92 and vector generator 88 are combined in the vertical adder 93 to provide a vertical deflection signal to the cathode ray tube display 90.

The intensity information in the output register 85 is converted into an analog voltage by digital-to-analog converter 94. The intensity gate 89 allows the output of the digital-to-analog converter 94 to be applied to the intensity input of cathode ray tube display 90 for the duration of the timing pulse generated by the display control 83, for controlling trace brightness on the CRT viewing surface.

The digital memory 80, display control 83 and control data 84 blocks of FIG. 5 may be embodied in a display data processor whose special function is to order the presentation of echo return data on the cathode ray tube display 90, or the function of said blocks may if preferred be performed by a general purpose computer programmed to present this data on the cathode ray tube display 90. The display itself may also be implemented in any of several alternative forms, using various of the known techniques for display symbol generation such as those enabling random or point-to-point entry of symbols either through dot pattern methods or, as in the preferred embodiment just described, through generation of analog waveforms for the X-Y deflection and intensity signals which stroke continuous lines at the desired points on the display. It also is possible to employ a raster scanned display if desired, with suitable display data processing for conversion of the data to be displayed to such different format.

While it generally is simpler to implement the display utilizing a stepwise advance across the viewing screen with one step per pulse interval, it may in some applications be preferable instead to provide effectively continuous movement of the display across the screen. This may be accomplished using essentially the same system configuration shown in the block diagram of FIG. 4, though certain of the elements of the system will of course need be more complex to enable processing at the higher data rates required to refresh the display at sufficiently high frequency as to make its movement appear continuous.

In the case of sonar systems, the pulse repetition frequencies typically employed are sufficiently low that a display of echo returns from perhaps 10 to 50 transmitted pulses with the display advancing through one pulse interval for each pulse transmitted, i.e., with the display shifting once each PRP as shown for example in FIG. 3, provides a very graphic portrayal of target tracks and of target motion. In the case of radar systems, however, where pulse repetition frequencies typically are of the order of several hundred to several thousand hertz, there may be practical difficulties in attempting to display individually the echo return from every pulse transmitted, and to advance the display once each pulse repetition period as in the example described above. With such very short pulse intervals the total time period of target observation displayed would become correspondingly short, which could make target maneuvers less readily visible and correlation times undesirably brief. The relatively high display data rate required might also introduce complexities in processor implementation.

To avoid any such possible difficulties in high PRF radar displays it may be desirable to integrate the echo returns from a group of some selected number of returns, to derive an average or otherwise representative composite of that group which then would be processed and displayed in the same manner as described above for individual echo returns. Such integration process may conveniently be performed as a part of the receiver signal processing using well known integration techniques.

Alternatively, such integration may if desired by accomplished on the cathode ray tube screen by displaying all echo returns individually, but shifting the display only at relatively longer time intervals preferably equal to a selected multiple of the pulse repetition period. For example, the time intervals upon which each advance of the display occurs could be made equal to say 50 PRP's, rather than equal to one PRP as in the display of FIG. 3, in which case the total number of echo returns factored into the display would be correspondingly multiplied. With this display format all the traces representing echo returns from each group of 50 pulses transmitted would be superimposed one above another, which effectively would integrate the echo returns over each 50 PRP time interval and display the product of such integration above the appropriate Pulse Interval Number. Thus the rate of information display could be slowed and a longer period of target observation provided without discard of useful information. A similar result could be achieved by determining line segment slope as if the pulse repetition period where say 50 times its actual value, then incrementing one-fiftieth $\Delta T$ (FIG. 2) for each sweep so as to provide forty-nine fiftieths overlap of the traces constituting each line segment.

While the present invention has been described with reference to a particular embodiment thereof, it will be obvious to those skilled in the art that various changes and modifications may be made without departing from the invention in its broader aspects. For example, in lieu of single pulses of constant frequency as described there might instead be used pulse trains of like or different frequencies, or more complex "coded pulse" waveforms, with appropriate pre-processing of echo return signals to enable display of target information in accordance with the invention. It is contemplated in the appended claims to cover all variations and modifications of the invention which come within the true spirit and scope of my invention.

What I claim as new and desire to secure by Letters Patent of the United States is:

1. In a pulse-echo return system including means for radiating into a medium pulses of energy of known frequency and means for receiving return signals, a display system comprising:
   a. means for generating a first signal representing the pulse transit time from the radiation of a pulse of energy into the medium until reception of a return signal;
   b. means for generating a second signal representing the difference between the frequency of said pulse of radiated energy and the frequency of said return signal;
   c. means for generating a third signal representing the total time elapsed since radiation of said pulse of energy into the medium;
   d. means for storing said first, second and third signals for a plurality of return signals from a corresponding plurality of pulses;
   e. means for retrieving from said storage means said first, second and third signals; and
   f. display means having a display surface with first and second coordinates and including control means responsive to said retrieved first, second and third signals to produce a directed line segment on said display surface for each of successive series of return signals for simultaneous visual display thereof, each said line segment being positioned along said first and second coordinates at locations respectively determined by said retrieved first and third signals and being of slope determined by said retrieved second signal, said control means being further responsive to said retrieved third signal to advance all said directed line segments along said first coordinate in accordance therewith.

2. A pulse-echo return system as defined in claim 1, further comprising means for generating a fourth signal representing the amplitude of the return signal from said radiated pulse, and wherein said control means is responsive to said fourth signal to adjust the intensity of the corresponding directed line segment in accordance therewith.

3. A pulse-echo return system as defined in claim 1, wherein said control means is responsive to said retrieved second signals corresponding to two successive return signals which correlate in time and frequency to cause one endpoint of the directed line segment corresponding to the first of said successive signals to be located substantially coincident in both said coordinates with the opposite endpoint of the directed line segment corresponding to the second of said successive signals, whereby the two line segments together form a substantially continuous line.

4. In a pulse-echo return system including means for radiating into a medium pulses of energy of known frequency and means for receiving return signals reflected from a target object, a display system for processing the return signals to provide a visible target line, comprising:
   a. means for generating a range signal derived by measure of the time required for transit of the pulse through the medium to the target object and return;

b. means for generating a range rate signal derived by measure of the difference between the frequency of said pulse as radiated and its frequency as returned;
c. means for generating a third signal representing the total time elapsed since radiation of said pulse into the medium;
d. means for storing said first, second and third signals for a plurality of return signals from a corresponding plurality of pulses;
e. means for retrieving from said storage means said first, second and third signals; and
f. display means having a display surface with X-Y coordinate axes and including control means responsive to said retrieved range, range rate and elapsed time signals to produce a directed line segment on said display surface for each of a successive series of return signals for simultaneous visual display thereof, each said line segment having a common reference point which is located along a first of said coordinate axes at a position determined by said range signal and which is located along the second of said coordinate axes at a position which moves in accordance with said elapsed time signal, each said line segment being of slope determined by said range rate signal and being of width as projected onto said second coordinate axis approximately equal to the width of the display surface along that axis divided by the number of directed line segments representing the return signals to be displayed, whereby the directed line segments representing returns from a target object will together form a substantially continuous target track line on the display surface.

5. A pulse-echo return system as defined in claim 4, further comprising means for generating a fourth signal representing the amplitude of the return signal from said radiated pulse, and wherein said control means is responsive to said fourth signal to adjust the intensity of the corresponding directed line segment in accordance therewith.

6. A pulse-echo return system as defined in claim 4 including means for generating transmission start signals upon radiation of successive pulses into said medium, and wherein said control means is responsive to said transmission start signals to shift said directed line segments in step-wise fashion along said second coordinate axis and across the display surface.

7. The display system of claim 4 wherein said means for generating a range rate signal consists of filter means for breaking each return signal into a plurality of filter signals, comparison means for identifying, during a fixed range interval, which of said filter signals has the largest amplitude, and threshold means for providing a threshold signal when said identified filter signal exceeds a threshold level and wherein said storage means is responsive to said threshold signal.

* * * * *